United States Patent
Safaee-Rad et al.

(10) Patent No.: US 7,095,883 B2
(45) Date of Patent: Aug. 22, 2006

(54) MOIRÉ SUPPRESSION METHOD AND APPARATUS

(75) Inventors: Reza Safaee-Rad, Etobicoke (CA); Aleksander Crnatovic, Toronto (CA); Jeffrey A. Hawthorne, San Francisco, CA (US); Ray Leerentveld, Palgrave (CA); William K. Pratt, Los Altos, CA (US); Sunil S. Sawkar, Fremont, CA (US)

(73) Assignee: Photon Dynamics, Inc., San Jose, CA (US)

( * ) Notice: Subject to any disclaimer, the term of this patent is extended or adjusted under 35 U.S.C. 154(b) by 639 days.

(21) Appl. No.: 10/189,274

(22) Filed: Jul. 3, 2002

(65) Prior Publication Data

US 2003/0059101 A1  Mar. 27, 2003

Related U.S. Application Data

(60) Provisional application No. 60/303,601, filed on Jul. 5, 2001.

(51) Int. Cl.
*G06K 9/00* (2006.01)

(52) U.S. Cl. .......................... 382/141; 345/55; 345/87; 382/141; 382/275

(58) Field of Classification Search ................. 345/55, 345/87; 382/141, 149, 275
See application file for complete search history.

(56) References Cited

U.S. PATENT DOCUMENTS 5,307,152 A * 4/1994 Boehnlein et al. .......... 356/605
5,764,209 A * 6/1998 Hawthorne et al. ........... 345/87
5,917,935 A * 6/1999 Hawthorne et al. ......... 382/149
6,075,893 A * 6/2000 Brandstetter et al. ....... 382/199
6,362,802 B1 * 3/2002 Fujiwara et al. ............... 345/87
6,717,661 B1 * 4/2004 Bernstein et al. ........... 356/121
6,831,995 B1 * 12/2004 Asano et al. ............... 382/141

* cited by examiner

*Primary Examiner*—Matthew C. Bella
*Assistant Examiner*—Gregory Desire
(74) *Attorney, Agent, or Firm*—Townsend and Townsend and Crew LLP

(57) ABSTRACT

A method for inspecting a display panel includes capturing images of a portion of a plurality of display panels having display elements with an image acquisition device having sensor elements, each image comprising an image of approximately a first number of display elements captured with approximately a second number of sensor elements, the first number different from the second number, each image including a Moiré artifact pattern, combining the images of the portion of the plurality of display panels to form a reference image including a Moiré artifact pattern reference, capturing a sample image of a portion of a sample display panel having display elements with the image acquisition device, the sample image comprising an image of approximately the first number of display elements on the sample display captured with approximately the second number of sensor elements, the sample image including a sample Moiré artifact pattern, combining the sample image with the reference image to inhibit the sample Moiré artifact pattern from the sample image, and to form a test image, determining defects in display elements in the portion of the sample display panel by inspecting the test image, and determining whether to reject the sample display panel in response to the defects in the display elements.

20 Claims, 9 Drawing Sheets

MOIRÉ SUPPRESSION METHOD AND APPARATUS

CROSS REFERENCE TO RELATED APPLICATIONS

This is a non-provisional of 60/303,601, filed Jul. 5, 2001 which is incorporated by reference for all purposes.

BACKGROUND OF THE INVENTION

The present invention relates to automated inspection systems. More particularly, the present invention relates to methods and apparatus for inspecting portions of a substrate.

Automated visual inspection of substrates is jokingly said to be the technology of the "future." That is, visual inspection technology that is something that is achievable only in the future, and not today. There are many reasons why reliable visual inspection of substrates have not been achievable today. Some of the reasons include that the high resolution sensor arrays that are often required have not been economically viable, and that acquisition of images that only highlight defects is virtually impossible.

As one example, in the field of display inspection systems, the displays that are to be inspected often have a large number of display pixels, such as 1900×1200, 1600×1200 or the like. Further, for the high resolution displays described above, if such displays are conventional RGB-type displays, each pixel includes as many as three color sub-pixels. Accordingly, whereas the display may have a stated 1600×1200 resolution, the inventors have determined that the effective inspection resolution for such displays is even higher. For example, a 1600×1200 display will actually have a horizontal resolution of 4800 sub-pixels, giving an effective resolution of at least 4800×1200. Accordingly, acquiring images of such displays for inspection purposes requires high resolution cameras.

In contrast, high resolution commercially available CCD cameras typically have resolutions such as 1900×1200, 4096×4096 (4K×4K), and the like. In light of this, the inventors have determined that the use of lower resolution cameras have advantages over the use of higher resolution cameras for inspection of such substrates. For example, high resolution cameras often have special operational requirements that are not needed for cameras having lower resolutions (e.g. 1K×1K or 2K×2K). Furthermore, lower resolution cameras are typically much cheaper than higher resolution cameras. For example it is believed that a 2K×2K sensor camera will cost less than one quarter the cost of a 4K×4K camera.

To further compound the problem, current displays, such as liquid crystal displays, typically have thin black borders surrounding each sub pixel. It is believed in the industry that the thin black border surrounding sub-pixels helps improve the contrast ratio of such displays and helps hide slight mis-alignments between adjacent display sub-pixels. These black borders are typically much smaller in width and height than the display sub-pixels, e.g. they are less than one-tenth the width of a display sub-pixel. In other embodiments, the relative sizes may be different.

FIG. 6 illustrates an exemplary display pixel to be inspected. As can be seen, one display pixel 600 is approximately square and currently range from 80 microns to 100 microns per side. As illustrated, display pixel 600 includes sub-pixels 610–630, typically representing red, green and blue display elements. These sub-pixels are separated by cell-walls that appear black on a display, hence the sub-pixels appear separated by thin black borders. For example, sub-pixels 610–630 are separated by cell-wall region 640–650 in FIG. 6. In this embodiment, the ratio of widths between a sub-pixel, such as sub-pixel 610 and a cell-wall region, such as 640 are approximately 10:1. A more detailed diagram illustrating the relationships between sub-pixels and cell-walls can be found in U.S. Pat. No. 5,754,678, assigned to the current assignee of the present patent application.

The inventors have determined that it is not necessary to inspect the thin black border surrounding such sub-pixels, but to only inspect the sub-pixels themselves. However, the inventors have learned that those thin black borders interfere with the inspection of the sub-pixels. More specifically, if two camera pixels capture each sub-pixel, as illustrated in FIG. 6, fulfilling the Nyquist sampling principle, there will still be aliasing during the capture of the thin black borders. As a result, the thin black borders will appear on a captured frame of the display as a Moiré artifact pattern. The inventors have discovered that this Moiré artifact pattern can be characterized as a low spatial frequency undulations or a "beat frequency" appearing horizontally and a typically different beat frequency appearing vertically on the image. The Moiré artifact, not considered a "defect" on the display, may also be quasi-repetitive.

Accordingly, when capturing images of a display for automatic inspection purposes, or the like, the inventors have discovered that this Moiré artifact on the captured image interferes with the inspection of the display. That is, one is unable to capture images of the display that highlight only true defects on the display such as bright pixels, dark pixels, and the like.

In light of the above, what is desired are methods and apparatus for capturing images of displays for inspection purposes without the drawbacks discussed above.

BRIEF SUMMARY OF THE INVENTION

The present invention relates to inspection of substrates. More specifically, the present invention relates to inspection of display substrates such as liquid crystal displays, plasma displays, and the like.

According to one aspect of the invention, a method for inspecting a display panel is disclosed. One technique includes capturing images of a portion of a plurality of display panels having display elements with an image acquisition device having sensor elements, each image comprising an image of approximately a first number of display elements captured with approximately a second number of sensor elements, the first number different from the second number, the image acquisition device positioned with respect to each of the plurality of display panels at a specified orientation, each image substantially including a Moiré artifact pattern, and combining the images of the portion of the plurality of display panels to form a reference image including a Moiré artifact pattern reference. Additionally, other techniques include capturing a sample image of a portion of a sample display panel having display elements with the image acquisition device, the sample image comprising an image of approximately the first number of display elements on the sample display captured with approximately the second number of sensor elements, the image acquisition device positioned with respect to the sample display panel at the specified orientation, the sample image including a sample Moiré artifact pattern and combining the sample image with the reference image to inhibit the sample Moiré artifact pattern from the sample image, and to form a test image. The steps of determining defects in display elements in the portion of the sample display panel by inspecting the test image, and determining whether to reject the sample display panel in response to the defects in the display elements may also be performed in various systems.

According to another aspect of the invention, a method for inspecting a flat panel display is disclosed. The process may include capturing images of a specific portion of a plurality of flat-panel displays, each image including a Moiré artifact pattern, combining the images to form a reference image, the reference image including a reference Moiré artifact pattern. and capturing a sample image of the specific portion of a sample flat-panel display, the sample image including a Moiré artifact pattern. Additionally, the process may also include combining the sample image with the reference image to inhibit the Moiré artifact pattern from the sample image and to form a test image, and determining defects in the sample flat-panel display by inspecting the test image.

According to another aspect of the invention, an apparatus for inspecting a flat panel display is described. The system may include an image acquisition device, a processor coupled to the image acquisition device, and a tangible media coupled to the image acquisition device and to the processor. The tangible media may include code that directs the processor to initiate capture of images of a specific portion of a plurality of flat-panel displays with the image acquisition device, each image including a Moiré artifact pattern, code that directs the processor to combine the images to form a reference image, the reference image including a reference Moiré artifact pattern, and code that directs the processor to initiate capture of a sample image of the specific portion of a sample flat-panel display with the image acquisition device, the sample image including a Moiré artifact pattern. Additionally, the tangible media may also include code that directs the processor to combine the sample image with the reference image to inhibit the Moiré artifact pattern from the sample image and to form a test image, and code that directs the processor to determine defects in the sample flat-panel display by inspecting the test image.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DESCRIPTION OF THE SPECIFIC EMBODIMENTS

Figure 1:
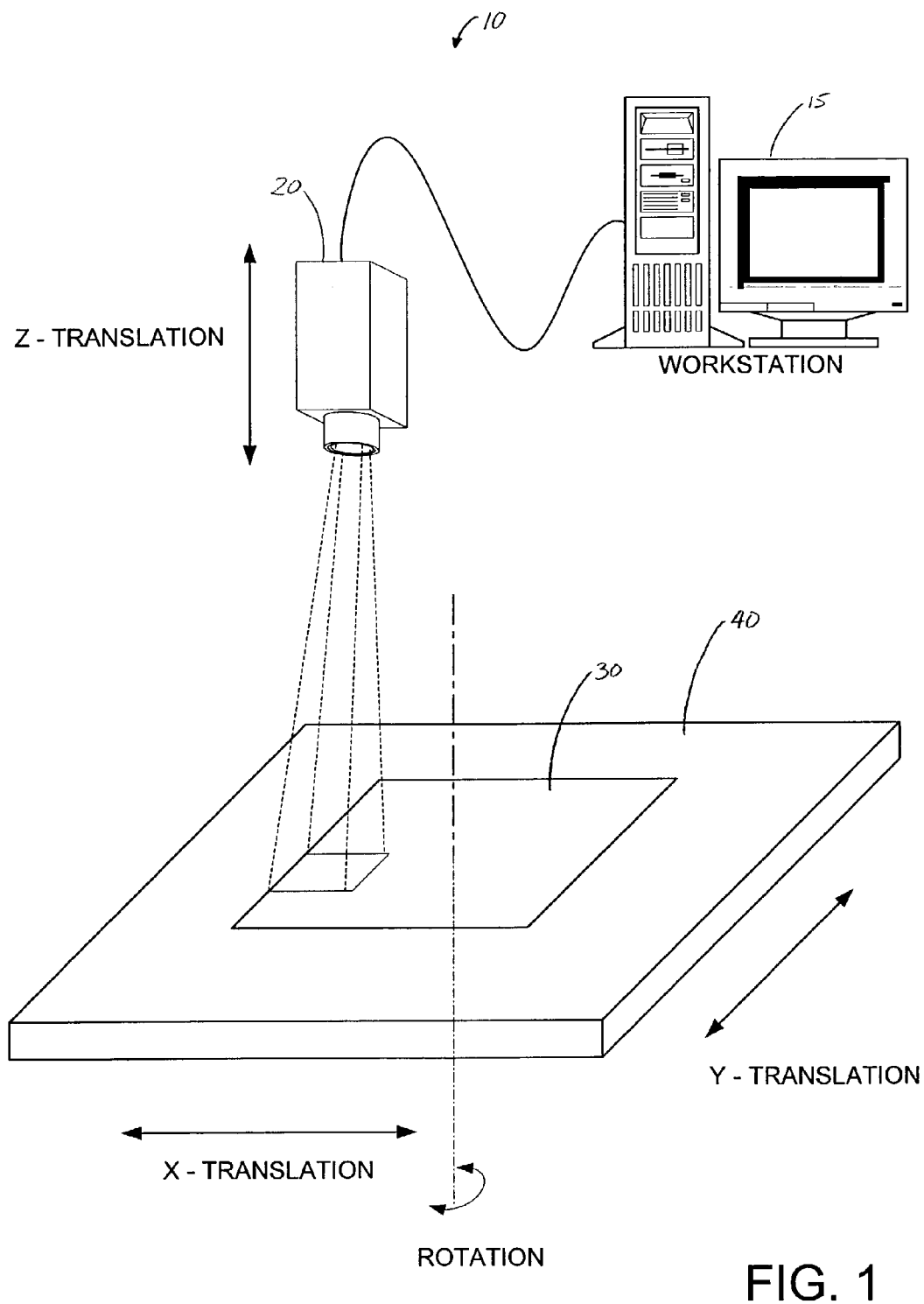
FIG. 1 illustrates an embodiment of the present invention.

FIG. 1 illustrates an embodiment of the present invention. FIG. 1 illustrates a system 10 including a computer system 15, a sensor 20, a workpiece 30, and staging 40.

In this embodiment sensor 20 is typically a camera such as a CCD camera, CMOS camera, line scan camera, or the like. Sensor 20 is used to capture images of workpiece 30 typically in the visible spectrum. In other embodiments, sensor 20 may be used to capture images of workpiece 30 in the infrared, ultraviolet, or other wavelength, including x-ray.

Workpiece 30 may be a flat panel display such as a liquid crystal display panel, a plasma display, a liquid crystal on semiconductor, flat CRT, or the like. In the present embodiment, workpiece 30 may include flat panel displays used for computers, for home entertainment systems, for consumer electronic devices, and the like. Such flat panel displays may include those using liquid crystal (LC), plasma, organic electroluminescence (OEL) materials, or the like. In one embodiment, the displays typically include a number of display pixels that are typically arranged into a regular array, or the like. In other embodiments, workpiece 30 may be a semiconductor, a web, or any other item in which optical inspection may be desired.

As illustrated in FIG. 1, workpiece 30 is typically mounted on staging 40. As shown, staging 40 can be typically repositioned with respect to sensor 20 in the x-direction, y-direction, and can also be rotated with respect to sensor 20. In other embodiments, staging 40 may be moved with respect to sensor 20 in six degrees of freedom. In addition, or alternatively, sensor 20 may also be moved with respect to workpiece 30 in six or fewer degrees of freedom.

Figure 2:
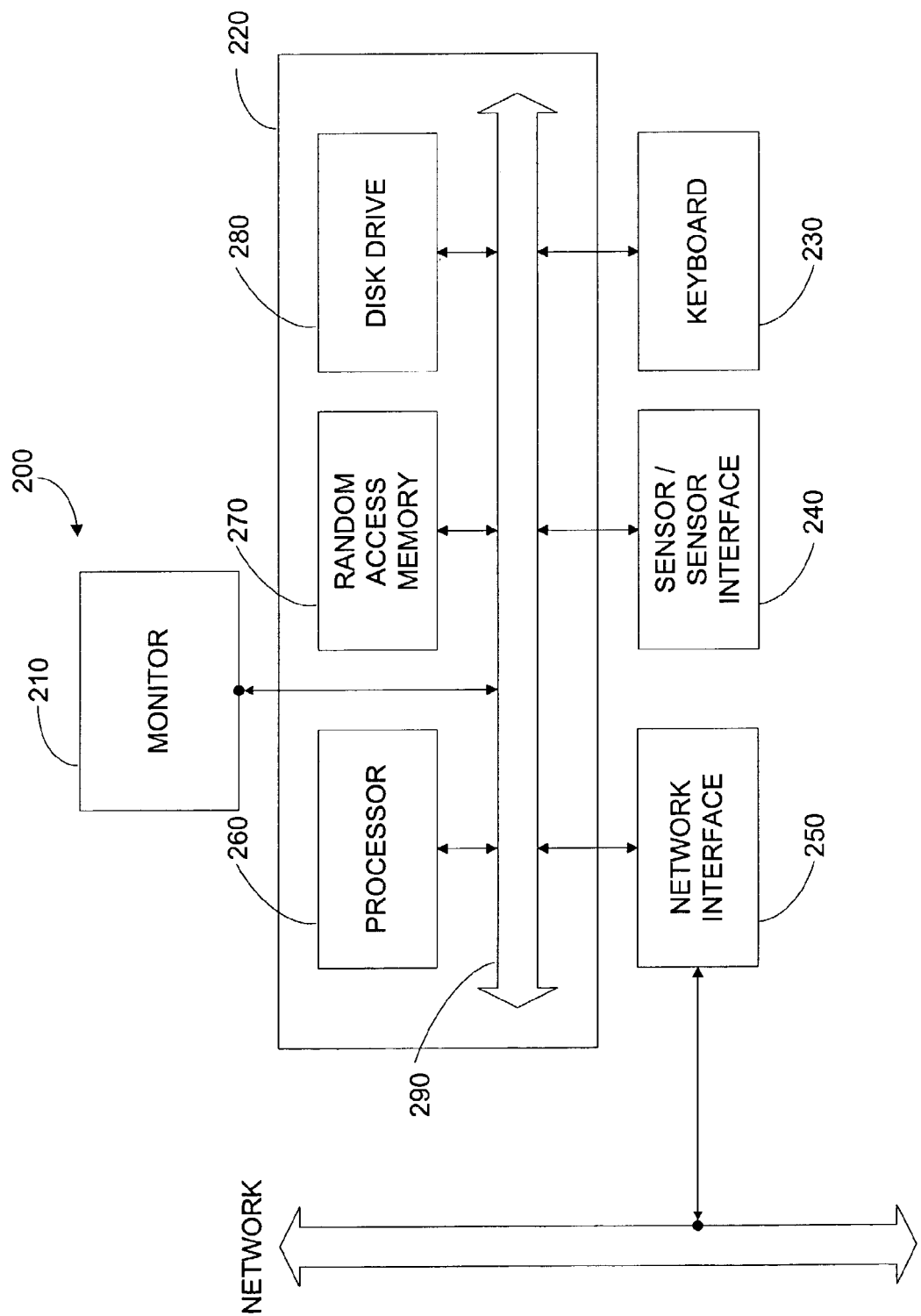
FIG. 2 is a block diagram of typical computer system according to embodiments of the present invention.

FIG. 2 is a block diagram of typical computer system 200 according to embodiments of the present invention.

In the present embodiment, computer system 200 typically includes a monitor 210, computer 220, a user input device 230, a sensor 240 (and sensor interface), a network interface 250, and the like.

In the present embodiment, user input device 230 is typically embodied as a keyboard, computer mouse, a trackball, a track pad, wireless remote, and the like. User input device 230 typically allows a user to select objects, icons, text and the like that appear on the monitor 210.

Embodiments of network interface 250 typically include an Ethernet card, a modem (telephone, satellite, cable, ISDN), (asynchronous) digital subscriber line (DSL) unit, and the like. Network interface 250 are typically coupled to a computer network as shown. In other embodiments, network interface 250 may be physically integrated on the motherboard of computer 220, may be a software program, such as soft DSL, or the like.

Computer 220 typically includes familiar computer components such as a processor 260, and memory storage devices, such as a random access memory (RAM) 270, disk drives 280, and system bus 290 interconnecting the above components.

In one embodiment, computer 220 is a PC compatible computer having an x86 based microprocessor, such as an AthlonXP™ or Opteron™ microprocessors from Advanced Micro Devices, Inc. Further, in the present embodiment, computer 220 typically includes a Windows™ operating system such as WindowsXP, WindowsNT, or the like from Microsoft Corporation.

RAM 270 and disk drive 280 are examples of tangible media for storage of data, audio/video files, computer programs, browser software, embodiments of the herein described invention, databases, and the like. Other types of tangible media include floppy disks, removable hard disks, optical storage media such as CD-ROMS and bar codes, semiconductor memories such as flash memories, read-only-memories (ROMS), battery-backed volatile memories, and the like.

In the present embodiment, computer system 200 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of types of computer systems for embodying the present invention. It will be readily apparent to one of ordinary skill in the art that many other hardware and software configurations are suitable for use with the present invention. For example, other types of processors are contemplated, such as Pentium4™, Itanium™ or other microprocessors from Intel Corporation; PowerPC G3™, G4™ microprocessors from Motorola, Inc.; Crusoe™ microprocessors from Transmeta, and the like. Further, other operating systems can be used, such as Solaris, LINUX, UNIX, MAC OS from Apple Computer Corporation, and the like.

In one embodiment, computer system 200 may be embodied as a standard single-board computer or a special purpose computer board including appropriate peripherals. Another possibility is to use a "smart" camera that incorporates a processor for performing on-board processing. The image acquisition device is embodied as a CCD camera having an array of CCD elements. In other embodiments, other types of image acquisition devices may be used, such as CMOS camera, a line-scan camera, or the like.

Figure 3A:
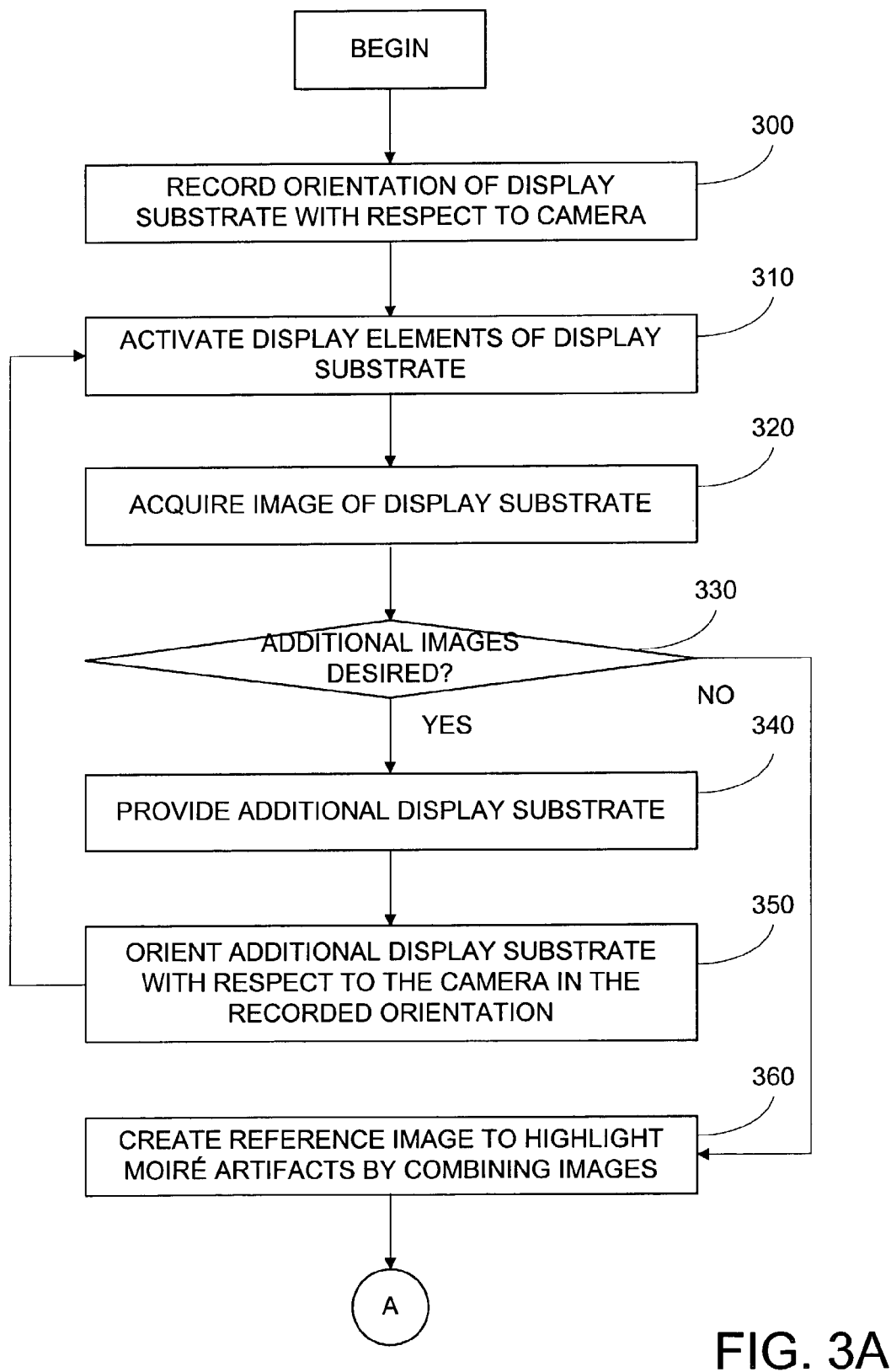
FIGS. 3A and 3B illustrate a block diagram according to an embodiment of the present invention.
Figure 3B:
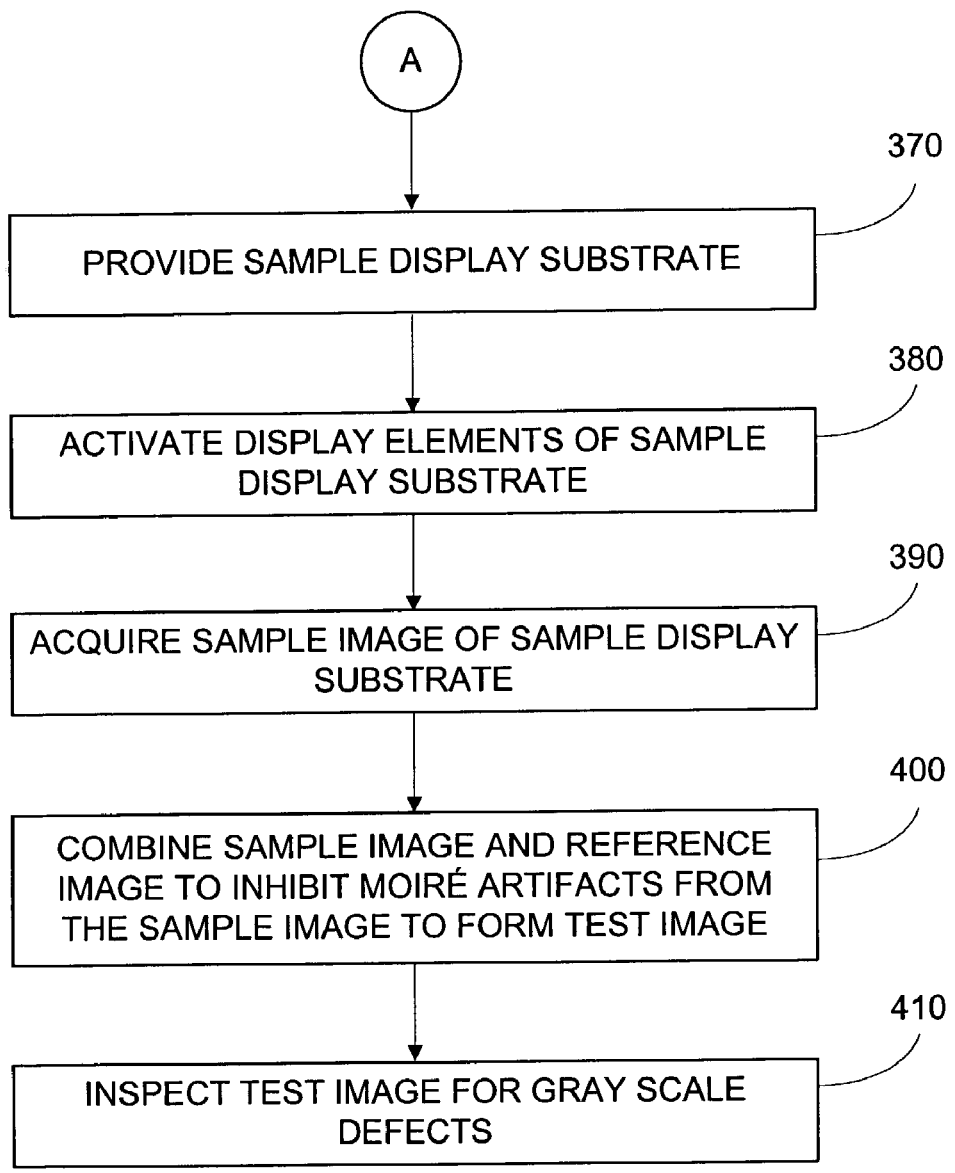

FIGS. 3A and 3B illustrate a block diagram according to an embodiment of the present invention.

Initially workpiece 30 is positioned with respect to camera 20, step 300. This position data is recorded for later use. In another embodiment, workpiece 30 is positioned in a predetermined position to camera 20. A number of positioning techniques can be used to determine the relative positions of camera 20 and workpiece 30 such as registering using the corners or holes of workpiece 30, using optical registration marks, using electronic probes and pads, and the like.

Next, workpiece 30 is typically electrically coupled to a driving source to activate the display pixels in workpiece 30, step 310. A number of techniques may be used to activate the pixels in workpiece 30, for example, in one embodiment, techniques invented by the assignee of the present invention may be used, as discussed in U.S. Pat. No. 5,081,687, incorporated by reference for all purposes.

Next, camera 20 acquires an image of a portion of workpiece 30, step 320. As discussed above, in the present embodiment, workpiece 30 may be a display that includes a large number of display pixels, such as 1600×1200 or the like. Additionally, if such displays are conventional RGB-type displays, each pixel may include as many as three color sub-pixels. Accordingly, the resolution for displays inspected by embodiments of the present invention are quite high, e.g. 4800 display sub-pixels horizontally by 1200 display sub-pixels vertically: 4800×1200.

In the present embodiment, camera 20 captures only a portion of workpiece 30, and not the whole image at one time. In this embodiment, lower-resolution cameras are used to acquire images of workpiece 30, this is because lower-resolution cameras are more cost effective than higher-resolution cameras.

As discussed above, in this embodiment of the present invention, the resolution of camera 20 and number of display element in the portion of workpiece 30 that is captured by camera 20 are different. In other words, there will typically be a mismatch between display pixels (and/or display sub-pixels) and sensor elements. More particularly, using the correct optics, one can approximately ensure that the Nyquist sampling theorem is satisfied, by matching every two sensor element (of the camera) per every display pixel (or sub-pixel) of the display being inspected. For example, to inspect 400 sub-pixels horizontally, camera 200 must use at least 800 horizontal pixels.

Figure 6:
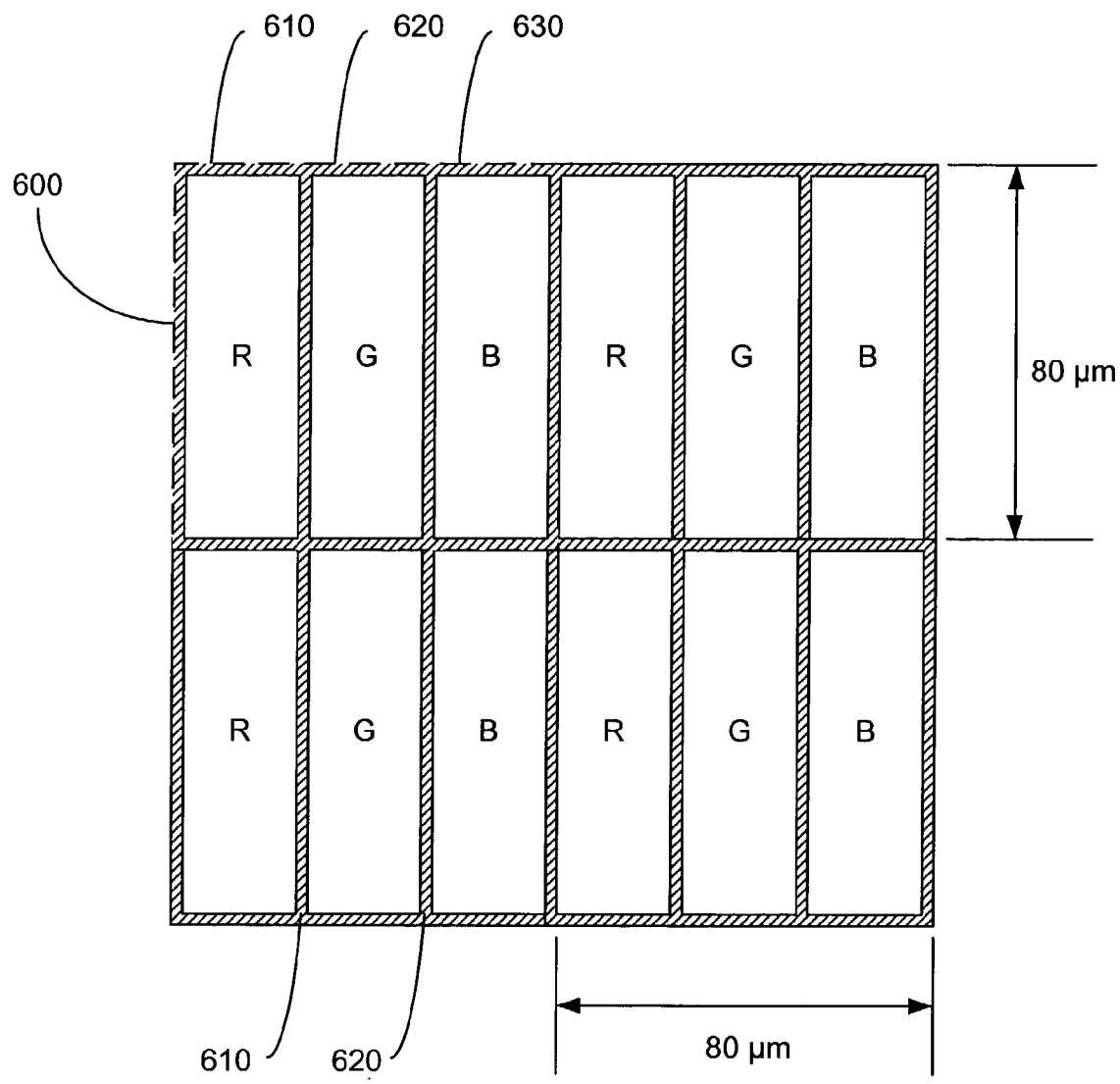
FIG. 6 illustrates an exemplary display to be inspected.

As also discussed above, with current RGB-type displays, each sub-pixel is typically surrounded by thin black borders that may be less than one-tenth the width of the display sub-pixel itself. In light of the above, although the sensor element may have a 2:1 ratio for a display sub-pixel, there will be a mismatch in the ratio between the sensor elements to the black borders. For example, as illustrated in FIG. 6, even if there is a 2:1 ratio for sensor element; display sub-pixels, where the black border is about one-tenth the width of the display sub-pixel, the ratio would be about 0.2 sensor elements for each black border, or 0.2:1. Such a ratio would be well below the Nyquist required 2:1 ratio and the black borders would be undersampled. In other embodiments, the thin black borders are typically less than half the width of a display sub-pixel; and in other embodiments, the thin black borders are less than about one fifth the width of the display sub-pixel, less than about one twentieth the width of the display sub-pixel, or the like.

One result of the ratio mismatches of the display sub-pixels and/or the black border to the sensor elements typically manifests itself as a Moiré artifact pattern superimposed on the image captured by the camera. This Moiré artifact pattern can be characterized as a low spatial frequency undulation appearing horizontally and vertically on the image. The Moiré artifact may also be quasi-repetitive.

As illustrated in the subsequent figures, when capturing images of a display for automatic inspection purposes, or the like, this Moiré artifact on the captured image may interfere with the inspection process.

In the present embodiment, the above process may be repeated a number of times for different workpieces, step 330. After the first iteration, subsequent workpieces are provided, step 340, and positioned relative to camera 200 in the substantially the same position and orientation (within physical tolerances of the alignment equipment) as the first workpiece, step 350, before camera 200 acquires images of a portion of the subsequent workpieces. Again, such alignment may be performed by optical, mechanical, or electrical means. By acquiring images of the same portion of subsequent workpieces, the inventors have discovered that the Moiré artifact observed on the first workpiece is also observed on the subsequent images.

In the present embodiment, images of any number of workpieces may be acquired. For example, in embodiments, images of 10, 20, 50, or even more workpieces may be acquired in the above steps. In alternative embodiments, fewer images may also be used.

After acquiring a number of images of portions of different workpieces, a Moiré artifact reference image is generated, step 360. In the present embodiment, this may be done by performing an average of each of the images acquired, above. In other embodiments, other ways for forming the reference image are contemplated, such as a weighted average, a threshold, then average, and the like. It is contemplated that any anomalies that appear on specific display panels, such as pixels or sub-pixels that do not work, are too bright, are too dark, stuck on, etc, will be greatly suppressed or reduced in the reference image after performing the averaging step, or the like, above. This reference image is used for inspection purposes, as will be described below.

It should be noted that the inventors have discovered that the workpieces do not need not be considered "golden" or "perfect" displays. Instead, conventional off-the assembly line displays may be used for generating the reference image. This discovery is significant, in that the time-consuming task of testing, identifying, and imaging workpieces to find a golden workpiece can be dispensed with. Instead, the reference image may simply be formed based upon workpieces that are off the assembly line. Further, because inspection systems 10 may be located in different cities and countries, each inspection system may be configured using locally produced workpieces. As such, the time and effort required to import golden displays from one factory or another can also be dispensed with.

In alternative embodiments, images of a combination of golden workpieces and other workpieces may be used. In such embodiments, a weighted average may be used for generating the reference image, with the golden workpiece having a larger weight than other workpieces. In any event, once the reference image has been determined, it may be saved and used, as described below.

In the present invention, typically at a later time, a display to be inspected (a sample display) is then inserted into the same workstation or computer system described above, step 370. Similar to the process above, the camera and the sample display are first positioned relative to each other in substantially the same position and orientation as practicable as for the display panels in the training stages, step 380. Optical markers, electrical connectors, physical reference marks, and the like may again be used to align the camera and the sample display to a high degree of accuracy.

Next, an image of the same portion of the sample display is taken as the reference image, step 390.

In this embodiment, it is expected that the image of the portion of the sample display (the sample image) will have substantially the same Moiré artifact pattern as images of portions of other display panels and of the reference image. Next in one embodiment, the Moiré artifact pattern is inhibited from the sample display, step 400.

In one embodiment of the present invention, the reference image is "subtracted" on a pixel by pixel basis from the sample image to inhibit the Moiré artifact pattern from the sample image. In another embodiment, a weighted reference image is subtracted from the sample image, and in other embodiments, other combinations of the reference image and the sample image may be performed such as a weighted addition, linear combination, division, scaling, masking, or the like. The resulting image, "test image," then represents the portion of the sample display panel with a reduced Moiré artifact pattern.

At this stage, it is contemplated that the test image has a reduced visible Moiré artifact pattern. Then, based upon the test image, the workstation inspects the test image for pixel defects, or the like, step 410. Such pixel defects may appear as bright or dark spots on the test image, or the like. Examples of this will be shown below.

The above process may be repeated to create additional test images that correspond to the different portions of the display. For example, if a reference image is captured as a series of four portions, then it is contemplated that images of the same four portions of the test display are generated. In one embodiment, an image of the entire test display is generated (e.g. a 4K×4K image) and then compared to the 4K×4K reference image to form a 4K×4K test image. In another embodiment, images of each different portion (e.g. 1K×1K) of the sample display is separately compared to 1K×1K images of each different portion of the reference image to generate a series of 1K×1K test images.

In one embodiment of the present invention, the number of defective pixels and the locations of the defective pixels are typically noted and stored in the workstation or computer system. This data is associated with the sample display, typically via production serial number of the sample display. In one embodiment, if the number of defective pixels per sample display or the number of defective pixels per portion of the sample image exceeds a threshold, the sample display may be marked as defective, or the like. In another embodiment, if the concentration of defective pixels is within a particular portion or area of the sample display, the sample display may also be marked as defective.

Figure 4A:
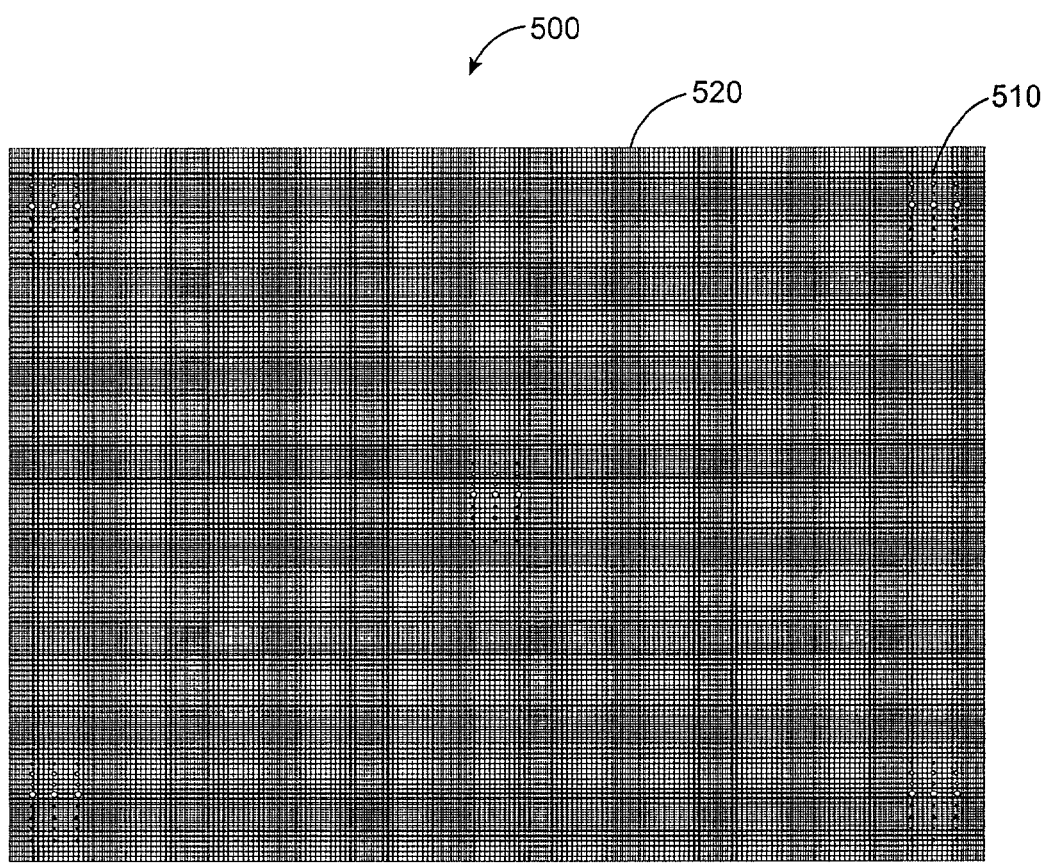
FIGS. 4A and B illustrate experimental results according to an embodiment of the present invention.
Figure 4B:
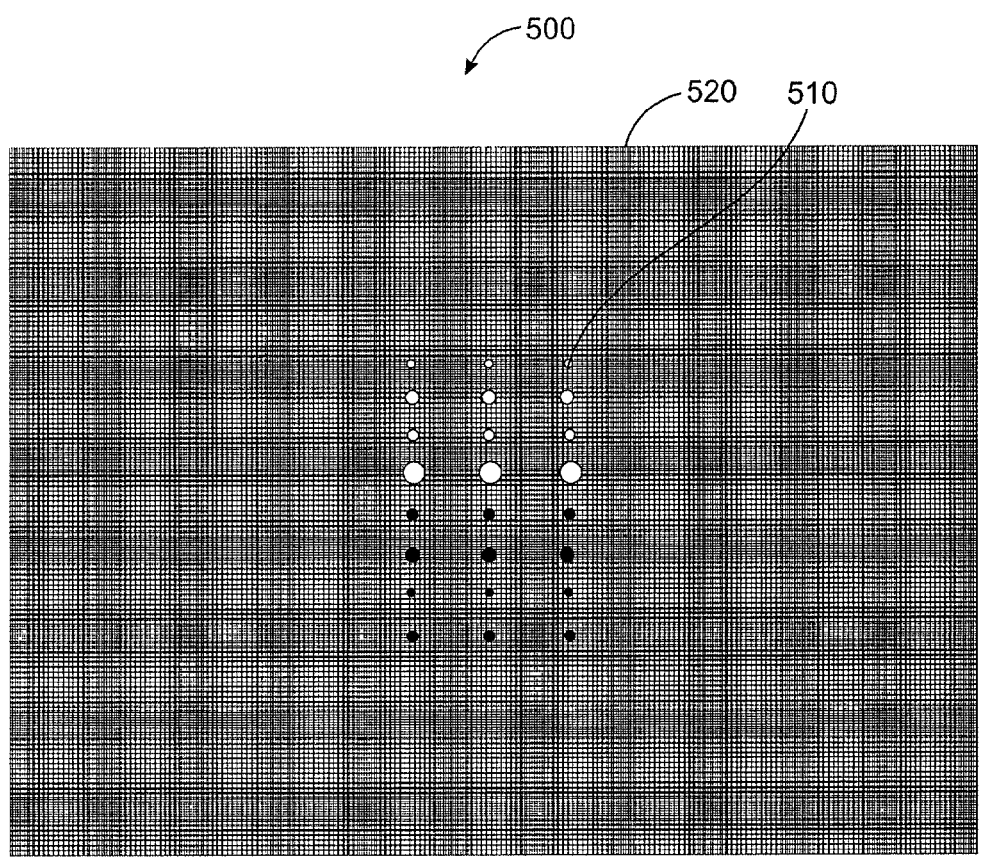

FIGS. 4A and B illustrate experimental results according to an embodiment of the present invention. More specifically, FIG. 4A illustrates an image 500 of at least a portion of sample display, and FIG. 4B illustrates a close-up of image 500. As can be seen on FIG. 4B, a series of defects 510 can be clearly seen. Further, a Moiré artifact pattern 520 can also be clearly seen. In this example, Moiré artifact pattern 520 is semi-periodic.

It is contemplated that by taking images of a number of displays, and combining them, as described above, a reference image may be formed that highlights the same Moiré artifact pattern as Moiré artifact pattern 520. For example, a reference image may appear similar to that shown in FIGS. 4A and 4B with the exception of defects 510.

Figure 5A:
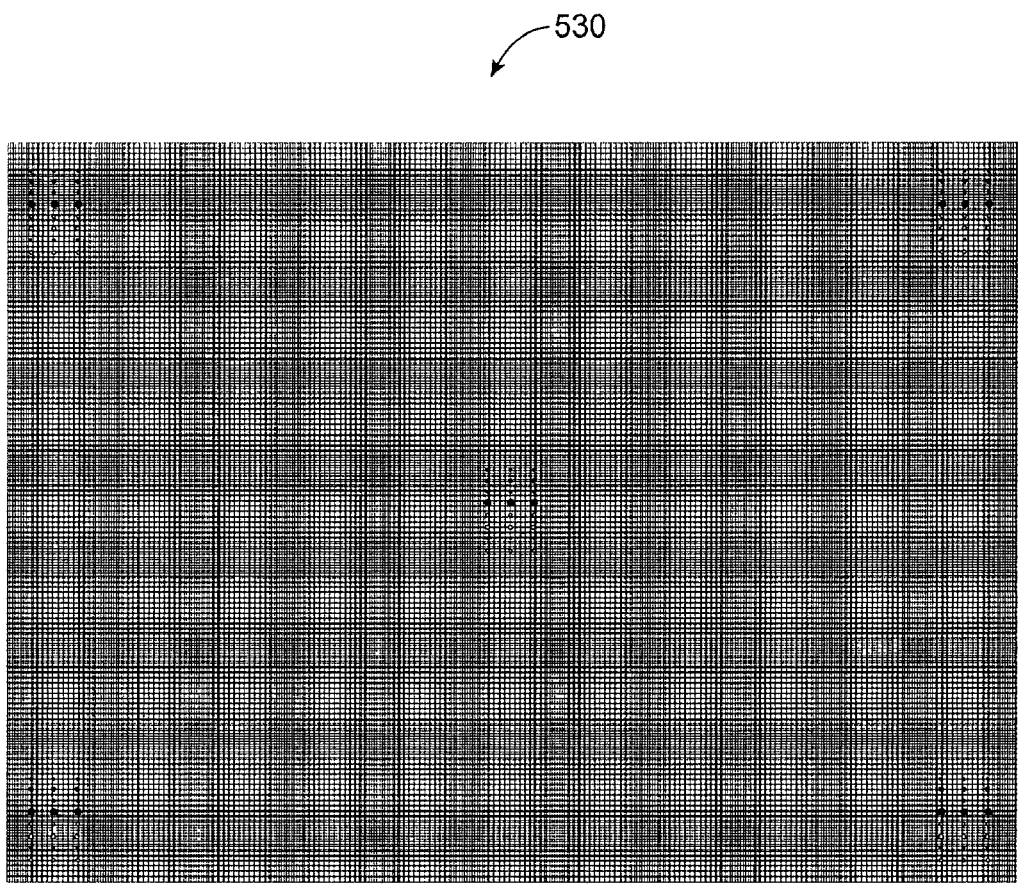
FIGS. 5A and B illustrate additional experimental results according to an embodiment of the present invention.
Figure 5B:
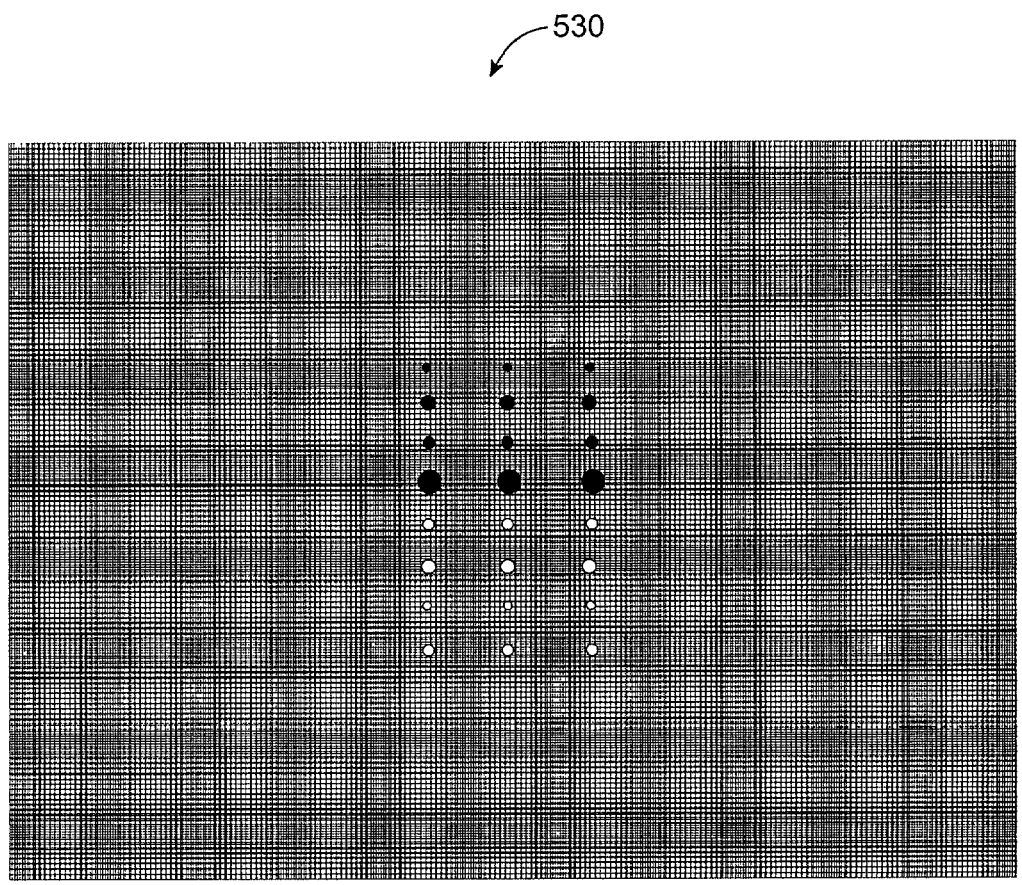

FIGS. 5A and B illustrate additional experimental results according to an embodiment of the present invention. More specifically, FIG. 5A illustrates an image 530 after Moiré artifact pattern 520 has been reduced from image 500, and FIG. 5B illustrates a close-up of image 530. As can be seen on FIG. 5B, series of defects 510 can now be more clearly seen, and Moiré artifact pattern 520 has been reduced. Defect analysis can now be performed on image 530.

In view of the above disclosure, many other variations can be envisioned. For example, in an alternative embodiment of the present invention, camera 20 captures a fraction of workpiece 30, such as approximately one fourth, one sixteenth, or the like of the display panel at a time. Camera 20 may then be repositioned relative to workpiece 30 and an image of a different portion of workpiece 30 may be acquired. This process may be repeated until images of all portions of the workpiece 30 are acquired. For example, camera 20 may take four, eight, sixteen, twenty-five or even more images of different portions of workpiece 30. It should be noted that the portions may overlap to some extent so that the multiple images may be registered. The amount of overlap may be easily determined by a user.

In alternative embodiments, an array of cameras can be used to capture portions or an entire display panel at a single time. Accordingly, the time required to reposition a single camera over workpiece 30 may be reduced. For example, instead of taking 25 images in 25 different positions, using a single camera, the system may take 5 images in 5 different positions, using 5 cameras. As another example, a 2K×2K camera may be moved and re-positioned in four different positions horizontally with respect to the display, and three different positions vertically with respect to the display to capture images of a test display. Accordingly, 12 different test images may be generated. In another embodiment, an array of 12 cameras at set positions with respect to a display may be used to acquire a complete image of the display.

In one embodiment, after images of workpiece 30 have been acquired, the images may be combined to become a single image of workpiece 30. In light of the above, the single image of workpiece and single images of other workpieces may be used in step 350 above, to generate a single reference image.

In other embodiments of the present invention, combinations or sub-combinations of the above-disclosed invention can be advantageously made. The block diagrams of the architecture and flowcharts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for inspecting a display panel comprises:
   capturing images of a portion of a plurality of display panels having display elements with an image acquisition device having sensor elements, each image comprising an image of approximately a first number of display elements captured with approximately a second number of sensor elements, the first number different from the second number, the image acquisition device positioned with respect to each of the plurality of display panels at a specified orientation, each image substantially including a Moiré artifact pattern;
   combining the images of the portion of the plurality of display panels to form a reference image including a Moiré artifact pattern reference;
   capturing a sample image of a portion of a sample display panel having display elements with the image acquisition device, the sample image comprising an image of approximately the first number of display elements on the sample display captured with approximately the second number of sensor elements, the image acquisilion device positioned with respect to the sample display panel at the specified orientation, the sample image including a sample Moiré artifact pattern;
   combining the sample image with the reference image to inhibit the sample Moiré artifact pattern from the sample image, and to form a test image;
   determining defects in display elements in the portion of the sample display panel by inspecting the test image; and
   determining whether to reject the sample display panel in response to the defects in the display elements.

2. The method of claim 1 wherein the Moiré artifact pattern is a result of undersampling borders between the display elements.

3. The method of claim 2
   wherein display elements have a first width and the borders have a second width; and
   wherein the first width is larger than the second width.

4. The method of claim 3 wherein the first width less than approximately ten times the second width.

5. The method of claim 2 wherein combining the sample image with the reference image comprises performing an operation on the sample image and the reference image, the operation selected from the group: subtraction, addition, masking, dividing.

6. The method of claim 3 wherein the display is selected from the class: liquid crystal display, plasma display, OLED display.

7. A method for inspecting a flat panel display comprises:
   capturing images of a specific portion of a plurality of flat-panel displays, each image including a respective Moiré artifact pattern associated with a flat-panel display from the plurality of flat-panel displays;
   combining the images to form a reference image, the reference image including a reference Moiré artifact pattern determined in response to the respective Moiré artifact pattern associated with a flat-panel display from the plurality of flat-panel display;
   capturing a sample image of the specific portion of a sample flat-panel display, the sample image including a sample Moiré artifact pattern;
   combining the sample image with the reference image to inhibit the sample Moiré artifact pattern from the sample image and to form a test image; and
   determining defects in the sample flat-panel display by inspecting the test image.

8. The method of claim 7 wherein combining the sample image with the reference image comprises subtracting the reference Moiré artifact pattern from the sample Moiré artifact pattern.

9. The method of claim 8 wherein the sample Moiré artifact pattern is formed by undersampling elements on the specific portion of the sample flat-panel display.

10. The method of claim 9
    wherein the elements comprise display elements and borders between display elements; and
    wherein determining defects comprises determining defects of display elements.

11. The method of claim 10 wherein a width of borders between display elements is less than a width of display elements on the sample flat-panel display.

12. The method of claim 11 wherein the width of display elements are greater or equal to ten times the width of the border between display elements.

13. The method of claim 7 wherein combining the sample image wit the reference image comprises an operation selected from the group: weighted subtraction, addition, scaling, division, multiplication.

14. An apparatus for inspecting a fist panel display comprises:
    an image acquisition device;
    a processor coupled to the image acquisition device; and
    a tangible media coupled to the image acquisition device and to the processor, the tangible media including:
       code that directs the processor to initiate capture of image of portions of a plurality of flat-panel displays wit the image acquisition device, each image including a respective Moiré artifact pattern associated with a flat-panel display from the plurality of flat-panel displays;
       code that directs the processor to combine the images to form a reference image, the reference image including a reference Moiré artifact pattern formed in response to respective Moiré artifact pattern associated with the plurality of flat-panel displays;
       code that directs the processor to initiate capture of a sample image of the specific portion of a sample flat-panel display with the image acquisition device, the sample image including a sample Moiré artifact pattern;

code that directs the processor to combine the sample image with the reference image to inhibit the sample Moiré artifact pattern from the, sample image and to form a test image; and code that directs the processor to determine defects in the sample flat-panel display by inspecting the test image.

15. The apparatus of claim 14 wherein the code that directs the processor to combine the sample image with the reference image comprises code that directs the processor to subtracting the reference Moiré artifact pattern from the sample Moiré artifact pattern.

16. The apparatus of claim 14 the sample Moiré artifact pattern is formed in response to undersampling elements on the specific portion of the sample flat-panel display.

17. The apparatus of claim 16
wherein the elements comprise display elements divided by display walls; and wherein code that directs the processor to determine defects comprises code that directs the processor to determine defects of display elements.

18. The apparatus of claim 17 wherein the display walls have a thickness less than or equal to one half a thickness of the display elements.

19. The apparatus of claim 18 wherein the display elements comprises sub-pixels.

20. The apparatus of claim 17 wherein the display walls have a thickness less than or equal to one tenth a thickness of the display elements; and wherein the display elements comprise liquid crystal elements.

* * * * *